No. 840,563. PATENTED JAN. 8, 1907.
G. O. HALVORSON.
MACHINE FOR VENDING CIGARS FROM ORIGINAL BOXES.
APPLICATION FILED SEPT. 8, 1905.
2 SHEETS—SHEET 1.
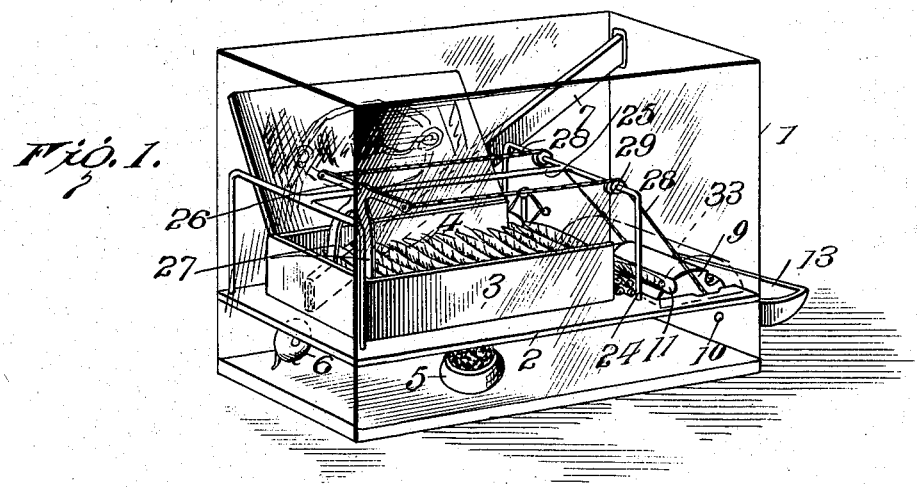
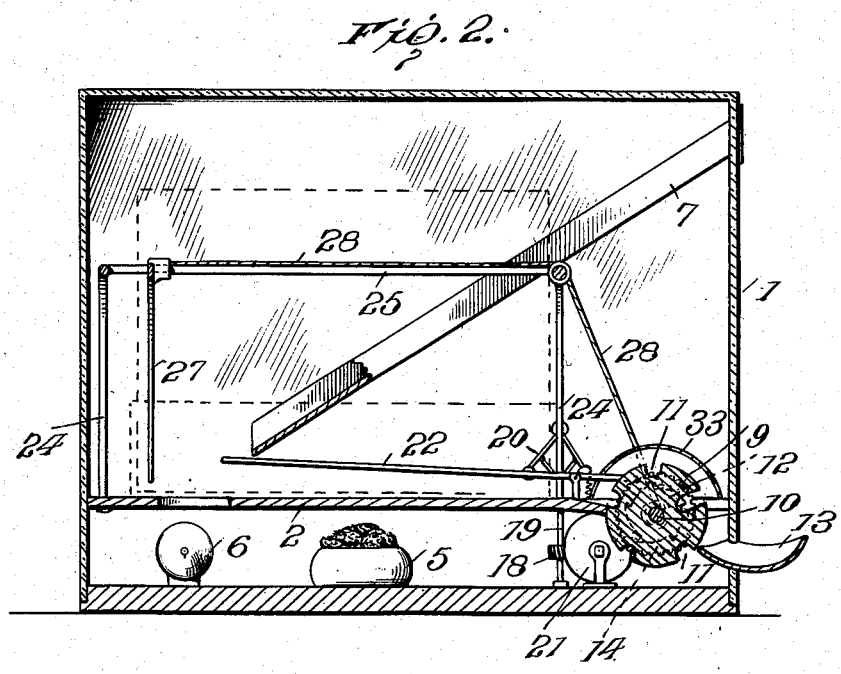
Witnesses
Inventor
George O. Halvorson
By Watson E. Coleman
Attorney No. 840,563. PATENTED JAN. 8, 1907.
G. O. HALVORSON.
MACHINE FOR VENDING CIGARS FROM ORIGINAL BOXES.
APPLICATION FILED SEPT. 8, 1905.
2 SHEETS—SHEET 2.
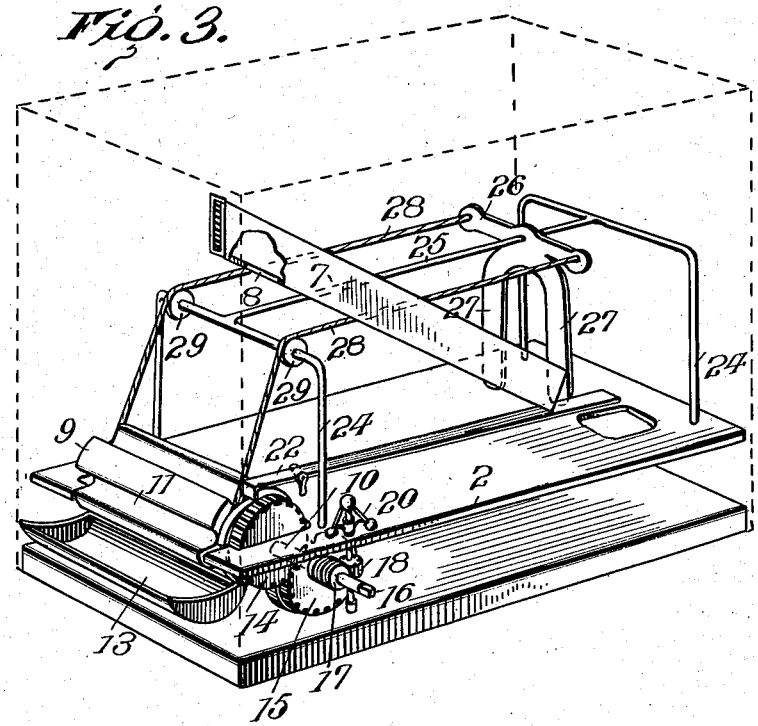
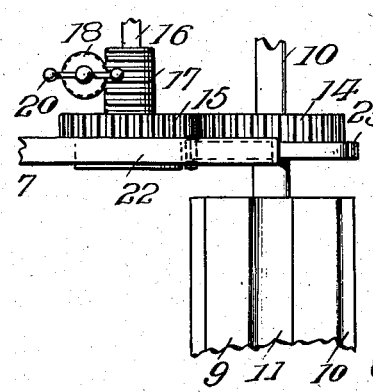
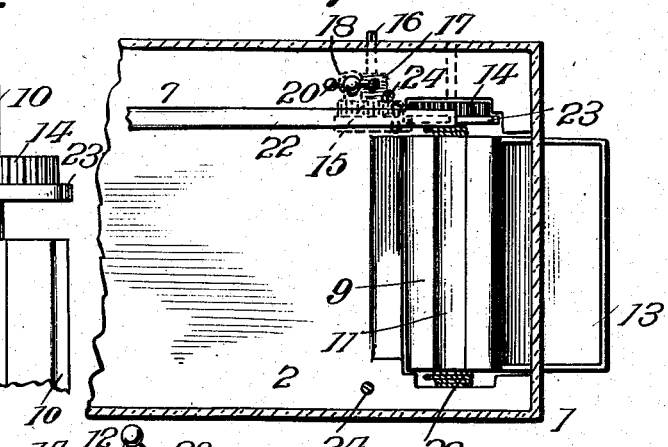
Witnesses
M. Imrie
L. O. Langworthy
Inventor
George O. Halvorson
By Watson E. Coleman
Attorney

UNITED STATES PATENT OFFICE.

GEORGE O. HALVORSON, OF BRICELYN, MINNESOTA.

MACHINE FOR VENDING CIGARS FROM ORIGINAL BOXES.

No. 840,563.  Specification of Letters Patent.  Patented Jan. 8, 1907.

Application filed September 8, 1905. Serial No. 277,567.

*To all whom it may concern:*

Be it known that I, GEORGE O. HALVORSON, a citizen of the United States, residing at Bricelyn, in the county of Faribault and State of Minnesota, have invented certain new and useful Improvements in Machines for Vending Cigars from Original Boxes, of which the following is a specification, reference being had therein to the accompanying drawings.

My invention relates to vending-machines, and particularly to those adapted for the sale of cigars and the like, my purpose being to provide a machine having for its object the provision of efficient, accurate, and inexpensive means for automatically dispensing such commodities at a unitary price and in quantities at a reduced price.

It is usual in the sale of cigars to charge, say, five cents each or six for a quarter. Many will purchase at this price when they would not at five cents straight, and it is therefore important that such provision be made in a device of this character. Moreover, if it is known that each fifth nickel will command two cigars there is a great incentive to the customer who would otherwise purchase but one to try again in the thought that the previous buyer had purchased but one or two and that therefore he, the present customer, may hope to receive the extra cigar without expending the quarter.

Many difficulties attend the automatic vending of cigars which do not obtain in the case of other objects, due to the fragility of the wrapper, the uneven taper of the cigar, slight variations in size, &c., and these difficulties have been overcome in the present case by the happy combination of parts constituting this invention, which will be hereinafter particularly claimed and which is illustrated as embodied in a preferred form in the drawings hereto annexed, wherein—

Figure 1 is a complete perspective view of the device in use. Fig. 2 is a vertical section with certain parts broken away. Fig. 3 is a perspective of the operating mechanism. Fig. 4 is a plan of the delivery-drum. Fig. 5 is a detail of the motor. Fig. 6 is a plan of the motor and its connection with the drum.

The device consists of a case 1, of glass or of opaque material, as may be desired. In this case is supported a platform 2 at a distance above the bottom for the reception of a box 3 of cigars 4. The box is placed in position with the cover open to display its contents and has its one end broken away. Beneath the platform is a sponge-cup 5 to maintain a proper condition of humidity within the case and also a bell 6 to record sales. A chute 7 leads from one end of the case at an incline to a point immediately above the bell, which chute is provided near its entrance with a slot 8 in its lower portion to cull out pennies and other coins of insufficient size.

A delivery-drum 9, carried upon a horizontal shaft 10, journaled in the case adjacent to the open end of the cigar-box, is provided with five horizontal peripheral grooves, four of which (marked 11) are each adapted to contain one cigar, while the fifth (designated as 12) has a capacity for two cigars. Upon the opposite side of the drum from the box of cigars is arranged a discharge-trough 13, projecting within reach of the customer from a point where it will receive the cigars from the rotating drum.

Upon the shaft 10 is fixed a toothed pinion 14, meshing with a second pinion 15, carried by a short shaft 16, provided with a worm 17, engaging a worm-wheel 18 upon a spindle 19, controlled by a ball or fan governor 20. Upon the shaft 15 is the spring-motor, carried within a box 21. A pawl-lever 22 rests with its shorter arm in operative relation to the teeth of the spur-wheel 23, carried by the shaft 10, and with its longer arm beneath the lower end of the chute 7, so as to be engaged by the coin dropping therefrom.

Four standards 24, mounted on the platform 2, support a horizontal guide-rod 25, upon which slides a yoke 26, having depending arms 27. This yoke is connected by cords 28, running over pulleys 29 to the shaft 10, upon which they are wound. These arms rest within the cigar-box and push the contents to the delivery-drum as required under the influence of the cords drawn by the rotating drum.

The operation of the device is as follows: A coin deposited in the chute 7 falls upon and trips the lever 22 and then to the bottom of the case, ringing the bell 6. The tripping of the lever 22 momentarily releases the spring-wheel 23, which under the influence of the spring-motor rotates one tooth. The drum 9 turns sufficiently to discharge the contents of one of its grooves into the trough 13, while another groove is filled from the box by the feeding of the cigars forward by the yoke 27.

The grooves 11, as will be obvious, deliver one cigar each, and the groove 12 delivers two cigars. To contribute the element of uncertainty, the case may be opaque, or, better still, the drum may be covered by a shield 33 to prevent the position of the grooves being seen.

Therefore, having thus described my invention, what I claim as new, and desire to secure by Letters Patent of the United States, is—

1. In an automatic cigar-vending device, a rotary drum provided with horizontal grooves or pockets, means for actuating the drum, an inverted-U-shaped slidably-mounted delivery-yoke, a guide for the yoke, standards supporting the guide, and a connection between the yoke and the drum whereby said yoke is actuated.

2. In an automatic cigar-vending device, a rotary drum provided with horizontal grooves or pockets, means for actuating the drum, an inverted-U-shaped slidably-mounted delivery-yoke, a guide for the yoke, standards supporting the guide, a connection between the yoke and the drum whereby said yoke is actuated, and a case surrounding the whole.

3. In an automatic cigar-vending device, a receptacle for the cigars, a rotary drum provided with horizontal grooves or pockets, means for actuating the drum, an inverted-U-shaped slidably-mounted delivery-yoke, a guide for the yoke, standards supporting the guide, and a connection between the yoke and the drum whereby said yoke is actuated.

4. In an automatic cigar-vending device, a rotary drum provided with horizontal grooves or pockets, a shield thereover, means for actuating the drum, an inverted-U-shaped slidably-mounted delivery-yoke, a guide for the yoke, standards supporting the guide, and a connection between the yoke and the drum whereby said yoke is actuated.

5. In an automatic cigar-vending device, a platform, a receptacle for the cigars carried thereby, standards arranged by the receptacle, a horizontal guide-rod connecting the standards, an inverted-U-shaped delivery-yoke slidably mounted on the guide-rod and having its arms depending into the receptacle, a rotary drum provided with horizontal grooves or pockets, and a connection between the yoke and the drum whereby the yoke is actuated to deliver the cigars to the pockets in the drum.

6. In an automatic cigar-vending device, a platform, a receptacle for the cigars carried thereby, standards arranged by the receptacle, a horizontal guide-rod connecting the standards, an inverted-U-shaped delivery-yoke slidably mounted on the guide-rod and having its arms depending into the receptacle, a rotary drum provided with horizontal grooves or pockets, a connection between the yoke and the drum whereby the yoke is actuated to deliver the cigars to the pockets in the drum, and a shield for the drum.

7. In an automatic cigar-vending device, a platform, a receptacle for the cigars carried thereby, standards arranged by the receptacle, a horizontal guide-rod connecting the standards, an inverted-U-shaped delivery-yoke slidably mounted on the guide-rod and having its arms depending into the receptacle, a rotary drum provided with horizontal grooves or pockets, a connection between the yoke and the drum whereby the yoke is actuated to deliver the cigars to the pockets in the drum, a shield for the drum, and a discharge-trough mounted in front of the drum.

In testimony whereof I hereunto affix my signature in presence of two witnesses.

GEORGE O. HALVORSON.

Witnesses:
   E. E. ALDRICH,
   A. C. BAYERS.